Sept. 18, 1951 G. W. LAI 2,567,947
GLIDER POSITION INDICATING DEVICE
Filed Sept. 24, 1946 2 Sheets-Sheet 1

INVENTOR.
GUY W. LAI
BY
HIS ATTORNEYS

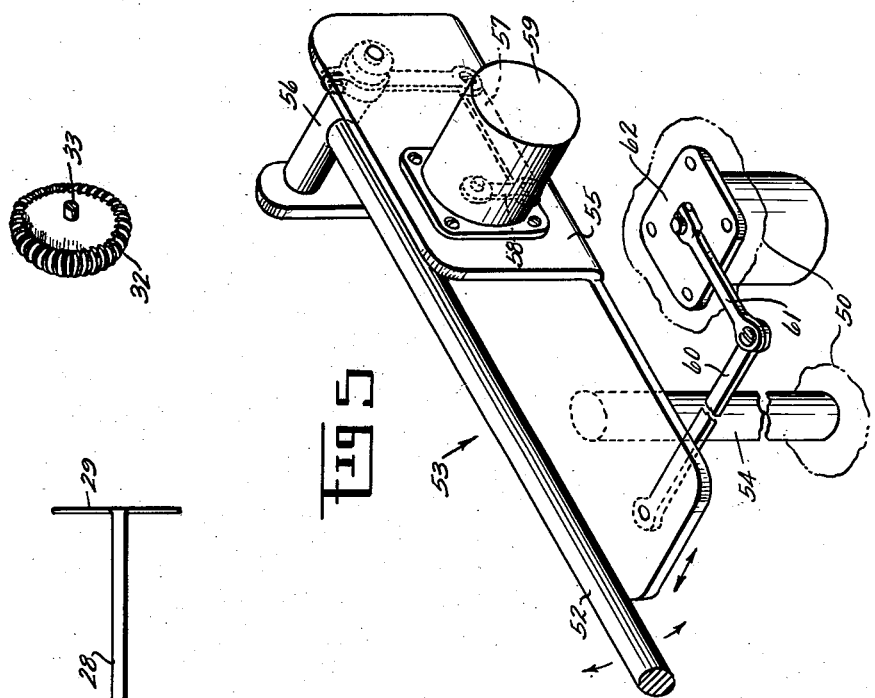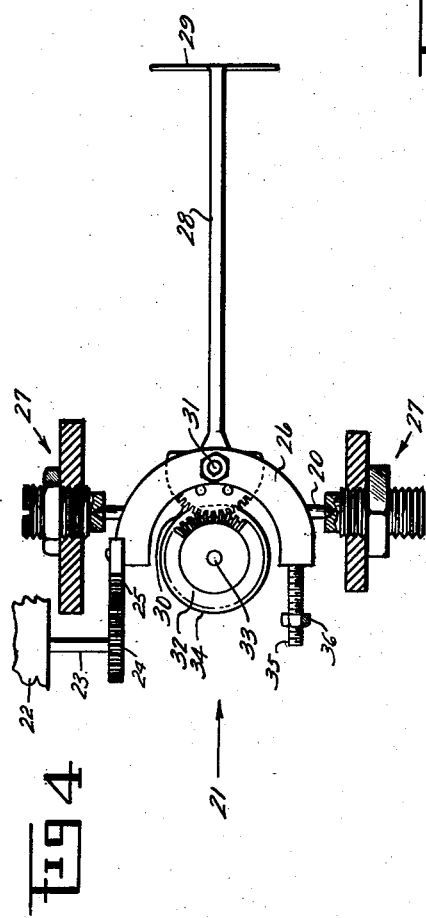

Patented Sept. 18, 1951

2,567,947

UNITED STATES PATENT OFFICE 2,567,947

GLIDER POSITION INDICATING DEVICE

Guy W. Lai, Osborn, Ohio

Application September 24, 1946, Serial No. 699,069

4 Claims. (Cl. 33—1)

(Granted under the act of March 3, 1883, as amended April 30, 1928; 370 O. G. 757)

The invention described herein may be manufactured and used by or for the Government for governmental purposes without payment to me of any royalty thereon.

This invention relates to a glider position indicating device. The device is electrically actuated and serves the purpose of informing the pilot of a glider which is being towed by an airplane whether the glider is on course. It will also inform him how much he is off the correct position for being towed and in what direction.

Heretofore no device of this character has been available to glider pilots in which the position of the glider to the towing plane could be continuously visualized. Unless such indications are available, the glider pilot must depend upon his unaided senses to keep the glider tracking the path of the towing airplane. Unless the pilot has unusual experience and ability, he will often fly his glider at an angle (yaw) to the course of the towing airplane or else fly it outside the proper tracking channel. In either case, much of the towing power and speed will be lost. If the deviation is great, danger may result.

One object of this invention therefore is to provide an indicating device that furnishes a single continuous signal that is easy to interpret for correction of all kinds.

Another object is to provide an instrument of this character that is practically free from lag.

Another object is to provide an instrument that is light in weight, easy to install and adapted to any glider-airplane towing combination.

Other objects will be apparent to those skilled in the art from the drawings and the following description.

In the drawings:

Fig. 2 is a diagrammatic representation of the tow rope between the towing airplane and the glider together with the arm and other apparatus arranged to give the electrical indications of correctness of tracking to the indicator.

Fig. 4 is a plan view of the pointer assembly of the indicator and its driving means. This view is taken on line 4—4 of Fig. 3. The driving means and pointer bearings are partly in section.

Fig. 5 is a perspective view of the towing arm at that end where it is attached to the towed glider. The assembly of electrical apparatus arranged to give signals to the indicator is shown.

Fig. 6 is a perspective view of a special gear used in the pointer drive to permit simultaneous rocking and driving of the pointer assembly.

Figure 1:
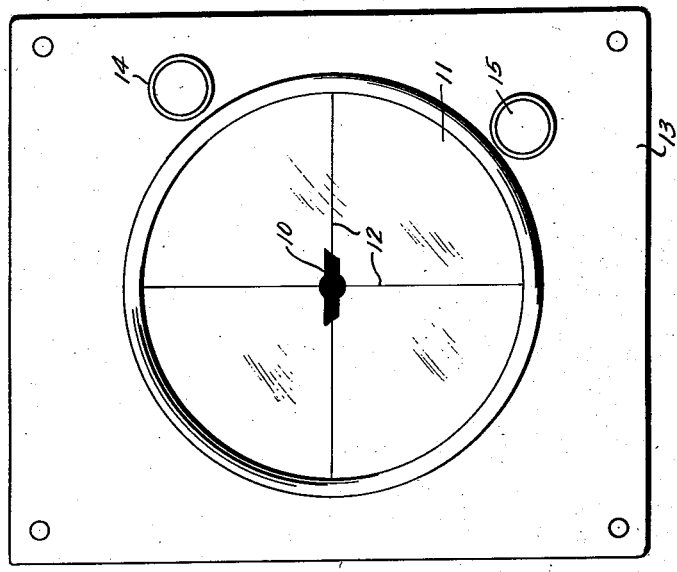
Fig. 1 is a front elevation of the indicator.

Referring to Fig. 1, which shows the indicator part of the entire indicating device, 10 is a movable indication representing the towed glider. It is visible through a dial 11, preferably of glass or plastic, upon which there are two cross hairs 12. The dial 11 is mounted by means of a bezel ring on a panel 13. When the glider is in correct tracking position, the indication 10 will center on the crosshairs 12 as shown. When the glider is off tracking position, the indication 10 will be displaced into one of the four quadrants of the dial 11 as defined by the crosshairs 12. The position of the indication 10 will show in what direction and to what extent the glider is off proper tracking course.

Before a flight is made, it is necessary to calibrate the indicator so that, under conditions of correct tracking, the indication 10 will be centered on the crosshairs. Knobs 14 and 15 are provided respectively for vertical and azimuth calibration. By turning them while simultaneously observing the indication 10, the amount of adjustment can be judged so as to bring the indication to the position shown in Fig. 1. The relation of the glider to the airplane must be known to be correct when such calibration takes place and such correctness can be provided and checked while both the airplane and glider are in flight.

Figure 3:
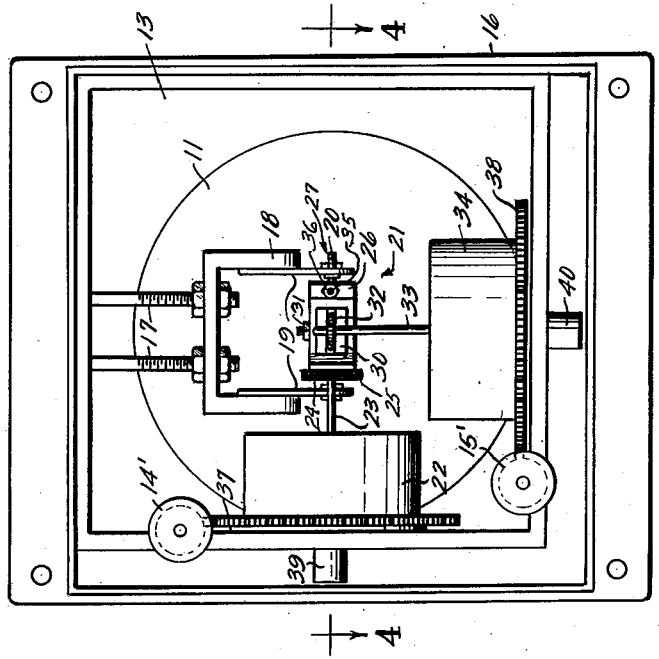
Fig. 3 is a rear view of the indicator and the assembly of electrical apparatus therein.

Referring now to Fig. 3, 16 is a box-like housing of which the panel 13 forms the front. Projecting downward from the top of housing 16 are a pair of stout bars 17. Securely attached to the bars 17 is a yoke 18, also of heavy section to diminish vibration. Within the yoke 18 a pair of light-section bars 19 descend to suspend a horizontal trunnion 20 of a pointer assembly 21 (Fig. 4). A vertical motion signal receiving selsyn 22 is mounted on a vertical sidewall of the housing 16 and has a drive shaft 23 which carries a spur gear 24 at its outer end. The gear 24 is in mesh with a gear sector 25 which is fixed on a yoke 26. The latter is carried by trunnion 20 between bearings 27. Motor 22 controls the vertical movement of yoke 26 and hence of a pointer 28 which is mounted therein. The latter carries a card 29 on its outer extremity, the shadow of which card forms the indication 10 on the dial 11.

The butt end of pointer 28 terminates in a gear sector 30 which is pivoted at the middle point of yoke 26 by a pivot 31. The pointer 28 is approximately equal in weight to the gear sector 30 so that the pointer will balance about the pivot 31. Gear sector 30 is in mesh with a special gear 32 which is mounted on the drive shaft 33 of a horizontal motion signal receiving selsyn 34 which is mounted on the floor of housing 16. Motor 34 is therefore enabled to actuate the pointer in azimuth.

Gear 32 is shown in perspective in Fig. 6 and it will be seen that it is flat like a spur gear and has spur gear teeth on its periphery. The teeth are rounded where their ends would normally be if the gear were merely of the spur variety. However, in gear 32, the teeth extend to both sides of gear blank and here their separating spaces become progressively shallower. In this respect, the gear 32 is somewhat similar to the winding button of a watch. The effect of the special form is, however, to permit the sector 30 to rock on the axis 26 about the face of gear 32 without any other compensation. I call the special form of gear a "coin" gear.

A threaded pin 35 projects rearwardly from that end of yoke 26 opposite the one carrying gear sector 25. A counter-weighting nut 36 is threadedly mounted on pin 35 so that the latter can be balanced.

Selsyns 22 and 34 are mounted respectively on pivots 39 and 40. Also mounted on these pivots but below the selsyn are gears 37 and 38, respectively. Gears 37 and 38 mesh respectively with worms 14' and 15' which are connected respectively through the panel 13 with knobs 14 and 15. Selsyns 22 and 34 are prevented from rotating as a whole by worms 14' and 15' from reaction created by the rotation of their armatures but can be rotated as a whole by turning the worms 14' and 15' by means of the knobs 14 and 15. They may be so rotated so that the indication 10 can be zeroed on the crosshairs 12. The zero setting will be preserved by reason of the irreversibility of the worm drives.

Referring now to Fig. 2, 50 is the glider, 51 the tow rope, 52 a rigid arm which extends from a point on the rope 51 to the assembly 53 shown in Fig. 5. The latter is attached to any suitable place on the glider fuselage by a mounting post 54. The latter serves as a horizontal motion pivot and is welded to a piece of angle iron 55 which is adapted to serve both as a mounting base and a link. A knuckle 56 is adapted to transmit vertical changes by means of links 57 and 58 to a vertical transmitter, i. e., a selsyn 59 which is mounted on one wing of the angle iron 55.

Other links 60 and 61 connect the outer end of angle iron 55 with a horizontal transmitting selsyn 62 which may have an otherwise independent mounting. Movement of angle iron 55 is not interfered with by the mounting post 54 because the latter is pivoted at a point not shown.

In operation, it is only necessary to install the indicator and assembly 53, connect them by electrical conductors (not shown), zero the indication 10 on the crosshairs 12 and then follow the airplane as it takes off. The glider controls are manipulated so that the indication 10 is kept on the crosshairs 12 in the position shown in Fig. 1 or as near thereto as possible.

It is to be understood that a transparent dial 11 may be employed. Both receiving selsyns are simultaneously actuable.

It is to be understood that modifications may be made in the structure herein described without departing from the spirit of the appended claims.

I claim as my invention:

1. In a glider position indicating device, a vertical motion signal generating selsyn, a horizontal motion signal generating selsyn, linkage including an arm, arranged to actuate said selsyns, a tow rope extending between a towing airplane and a towed glider, said tow rope being arranged to actuate said arm, an indicator arranged to receive signals from said generating selsyns and to convert said signals into a single visual indication of the correctness of the towing channel being followed by the towed glider, said indicator comprising a vertical motion signal receiving selsyn and a horizontal motion signal receiving selsyn and a balanced pointer, a pair of gears, each having a face of over 180° arc, each gear being operatively connected to said pointer for converting the movement of the respective receiving selsyn to a single visual indication capable of showing deviations from a projected course said receiving selsyns each being arranged to act upon said pointer simultaneously to move same in accordance with received signal from the generating selsyns and two independent manually operable means each comprising a meshing worm and a worm gear, each of the latter operatively encircling its respective receiving selsyns, and constituting means for angularly displacing said receiving selsyns whereby to center the visual indication respectively in elevation and azimuth to zero position.

2. In a position indicating device, for use with a tow rope, an arm attached at one end to a point on said tow rope, a knuckle on the other end of said arm, a support for the knuckle attached to the towed vehicle, and said knuckle providing a horizontal pivot for said arm on said towed vehicle, a horizontally mounted selsyn generator, a vertically mounted selsyn generator, a link system adapted to actuate one of said selsyns according to the kind of motion given to said arm, a second link system adapted to so actuate the other selsyn on the towed vehicle, an indicator comprising a pointer zeroed on a point, a doubly pivoted mounting for said pointer, said mounting being capable of substantially universal motion, a horizontally mounted receiving selsyn geared to said mounting, a gear of more than 180° arc through which said selsyn is geared, a vertically mounted selsyn geared to said mounting, a gear of more than 180° arc through which said selsyn is geared, each of said receiving selsyns being arranged to receive from one of said generating selsyns an electrical impulse indicative of the kind of motion received by the generating selsyn and to translate said motion into a mechanical impulse which will move the pointer mounting and pointer through an angle indicative of the angle that the tow rope is making wtih the direction of flight of the towing vehicle and two independent manually operable means each comprising a meshing worm and a worm gear, the latter operatively encircling its respective receiving selsyn, said worm and worm gear together constituting means for angularly displacing said receiving selsyn whereby to zero the visual indication at the point which will indicate the optimum position of the towed vehicle.

3. In a glider position indicator, a housing, a vertical motion signal receiving selsyn and a horizontal motion signal-receiving selsyn mounted on a vertical wall and the bottom respectively of said housing, a panel covering the front of said housing, a transparent dial mounted in said panel, independent zeroing knobs located respectively, adjacent the side wall and the bottom of said housing to zero the elevation and azimuth signal receiving selsyns respectively crosshair indicia on said dial, a pointer adapted to point at the intersection of the crosshair indicia and to cast a shadow thereon when a proper towing course is being followed and means including a balanced yoke connecting said pointer and said selsyns whereby both selsyns can simultaneously actuate said pointer to bring it to a position indicative of the vertical and horizontal motion signals received respectively by them.

4. In a position indicating device, a yoke, means for pivoting said yoke for vertical movement, a gear sector vertically mounted on said yoke, a selsyn responsive to signal calling for vertical movement of said yoke, said selsyn having a drive shaft, a gear on said drive shaft meshing with said gear sector, a pointer pivotally mounted in said yoke for horizontal movement therein, a horizontal gear sector associated with said pointer and also pivoted on the same axis as said pointer, an indicating card at the outer extremity of said pointer and a horizontal signal responsive selsyn, said selsyn having a drive shaft, a coin gear mounted on said drive shaft and meshing with said horizontal gear sector, both of said selsyns being simultaneously actuable.

GUY W. LAI.

REFERENCES CITED

The following references are of record in the file of this patent:

UNITED STATES PATENTS

| Number | Name | Date |
|---|---|---|
| 1,551,393 | Hewlett et al. | Aug. 25, 1925 |
| 2,080,490 | Kollsman | May 18, 1937 |
| 2,306,862 | Bown | Dec. 29, 1942 |
| 2,386,884 | Carlson | Oct. 16, 1945 |
| 2,451,244 | Scott et al. | Oct. 12, 1948 |